United States Patent
Bednekoff et al.

(10) Patent No.: US 6,603,810 B1
(45) Date of Patent: Aug. 5, 2003

(54) COMBINED SYSTEM FOR CALIBRATING RECEIVER GAIN AND MEASURING ANTENNA IMPEDANCE MATCH AND METHOD OF OPERATION

(75) Inventors: George A. Bednekoff, Plano, TX (US); Mitchell K. Johnson, McKinney, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/475,604

(22) Filed: Dec. 30, 1999

(51) Int. Cl.[7] .............................................. A04B 17/00
(52) U.S. Cl. ...................................... 375/228; 375/345
(58) Field of Search ................................. 375/224, 228, 375/316, 345; 455/67.4, 67.1, 67.2, 67.3, 67.5, 67.6, 67.7, 161.3, 63, 424, 425, 423, 562

(56) References Cited

U.S. PATENT DOCUMENTS 5,521,904 A * 5/1996 Eriksson et al. ............ 370/249
6,054,894 A * 4/2000 Wright et al. ............... 330/149

* cited by examiner

*Primary Examiner*—Tesfaldet Bocure
*Assistant Examiner*—Pankaj Kumar

(57) ABSTRACT

A measurement and calibration circuit is disclosed for use in a RF transceiver comprising an antenna and a RF receiver, having a receive path, coupled to the antenna. The measurement and calibration circuit comprises: a test signal generator for generating a known amplitude and frequency test signal; a switch having an input coupled to the test signal generator, a first output coupled to an input of the receive path, and a second output coupled to the antenna; a test controller for causing the switch to directly inject the test signal into the input of the receive path and causing the switch to inject the test signal into the antenna, wherein the antenna at least partially reflects the test signal into the receive path; and a signal monitor coupled to an output of the receive path for measuring the direct injected test signal and the reflected test signal.

30 Claims, 5 Drawing Sheets

COMBINED SYSTEM FOR CALIBRATING RECEIVER GAIN AND MEASURING ANTENNA IMPEDANCE MATCH AND METHOD OF OPERATION

CROSS-REFERENCE TO RELATED APPLICATIONS

The present invention is related to that disclosed in U.S. patent application Ser. No. 09/519,709, filed concurrently herewith, entitled "SYSTEM AND METHOD FOR MEASURING THE IMPEDANCE MATCH OF AN ANTENNA." application Ser. No. 09/519,709 is commonly assigned to the assignee of the present invention. The disclosure of this related patent application is hereby incorporated by reference for all purposes as if fully set forth herein.

TECHNICAL FIELD OF THE INVENTION

The present invention is directed, in general, to wireless communication systems and, more specifically, to a combined system for monitoring receiver gain and measuring receiver antenna impedance match in a base station in a wireless network.

BACKGROUND OF THE INVENTION

In order to increase the number of subscribers that can be serviced in a single wireless network, frequency reuse is maximized by making individual cell sites smaller and using a greater number of cell sites to cover the same geographical area. Accordingly, the greater number of base transceiver stations increases infrastructure costs. To offset this increased cost, wireless service providers continually implement any improvements that may reduce equipment costs, maintenance and repair costs, and operating costs, or that may increase service quality and reliability, and the number of subscribers that the cellular system can service.

Wireless service providers use a variety of test equipment to monitor the performance of the RF receiver and the RF transmitter of a base transceiver station (BTS). The test equipment may monitor a variety of signal parameters in the RF transmitter, including adjacent channel power ratio (ACPR), spectral purity (including in-band and out-of-band spurious components), occupied bandwidth, RHO, frequency error, and code domain power. The test equipment may also perform a variety of test functions in the RF receiver, including receive antenna impedance matching and receiver calibration. Preferably, the signal parameters are remotely monitored from a central location, so that a wireless service provider can avoid the expense of sending maintenance crews into the field to test each BTS individually. Additionally, a remote monitoring system can detect the failure of an RF transmitter or an RF receiver nearly instantaneously.

Unfortunately, adding some types of test equipment, such as spectrum analyzers, to a BTS significantly increases the cost of the BTS. In some cases, the cost of the test equipment may be greater than the cost of the BTS itself. As a result, wireless service providers frequently do not install test equipment in base transceiver stations, or install only a limited amount of test equipment to test only some of the functions of the BTS. The remaining functions must be monitored by maintenance crews using portable test equipment.

There is therefore a need in the art for inexpensive test equipment that may be implemented as part of the base station. In particular, there is a need for integrated test equipment that can perform more than one type of test in a base transceiver station. More particularly, there is a need for integrated test equipment that can be used to calibrate the gain of the receive path of the receiver and that can also be used to measure the impedance match of the receiver antenna.

SUMMARY OF THE INVENTION

To address the above-discussed deficiencies of the prior art, it is a primary object of the present invention to provide a measurement and calibration circuit for use in an RF transceiver comprising an antenna and an RF receiver coupled to the antenna and having a receive path comprising circuitry capable of amplifying an incoming signal received from the antenna. In an advantageous embodiment of the present invention, the measurement and calibration circuit comprises: 1) a test signal generator capable of generating a test signal having a known amplitude and a known frequency; 2) a switch having an input coupled to the test signal generator for receiving the test signal, a first output coupled to an input of the receive path, and a second output coupled to the antenna; 3) a test controller capable of causing the switch to directly inject the test signal into the input of the receive path and capable of causing the switch to inject the test signal into the antenna, wherein the antenna at least partially reflects the test signal into the receive path; and 4) a signal monitor coupled to an output of the receive path capable of measuring the direct injected test signal and the reflected test signal.

In one embodiment of the present invention, the signal monitor is capable of adjusting a gain of the receive path.

In another embodiment of the present invention, the known frequency of the test signal is the center frequency of the RF receiver.

In still another embodiment of the present invention, the test signal generator comprises a transmitter local oscillator capable of generating a transmitter carrier signal used by an RF transmitter of the RF transceiver, a test local oscillator capable of generating a single frequency reference signal, and an RF mixer capable of mixing the transmitter carrier signal and the single frequency reference signal.

In yet another embodiment of the present invention, a frequency of the single frequency reference signal is equal to a frequency difference between a center frequency of the RF transmitter and a center frequency of the RF receiver.

In a further embodiment of the present invention, the mixing by the RF mixer of the transmitter carrier signal and the single frequency reference signal is a subtractive mixing that generates the test signal at a center frequency of the RF receiver.

In a still further embodiment of the present invention, the signal monitor compares a measured value of the direct injected test signal and a measured value of the reflected test signal to determine an impedance match of the antenna.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
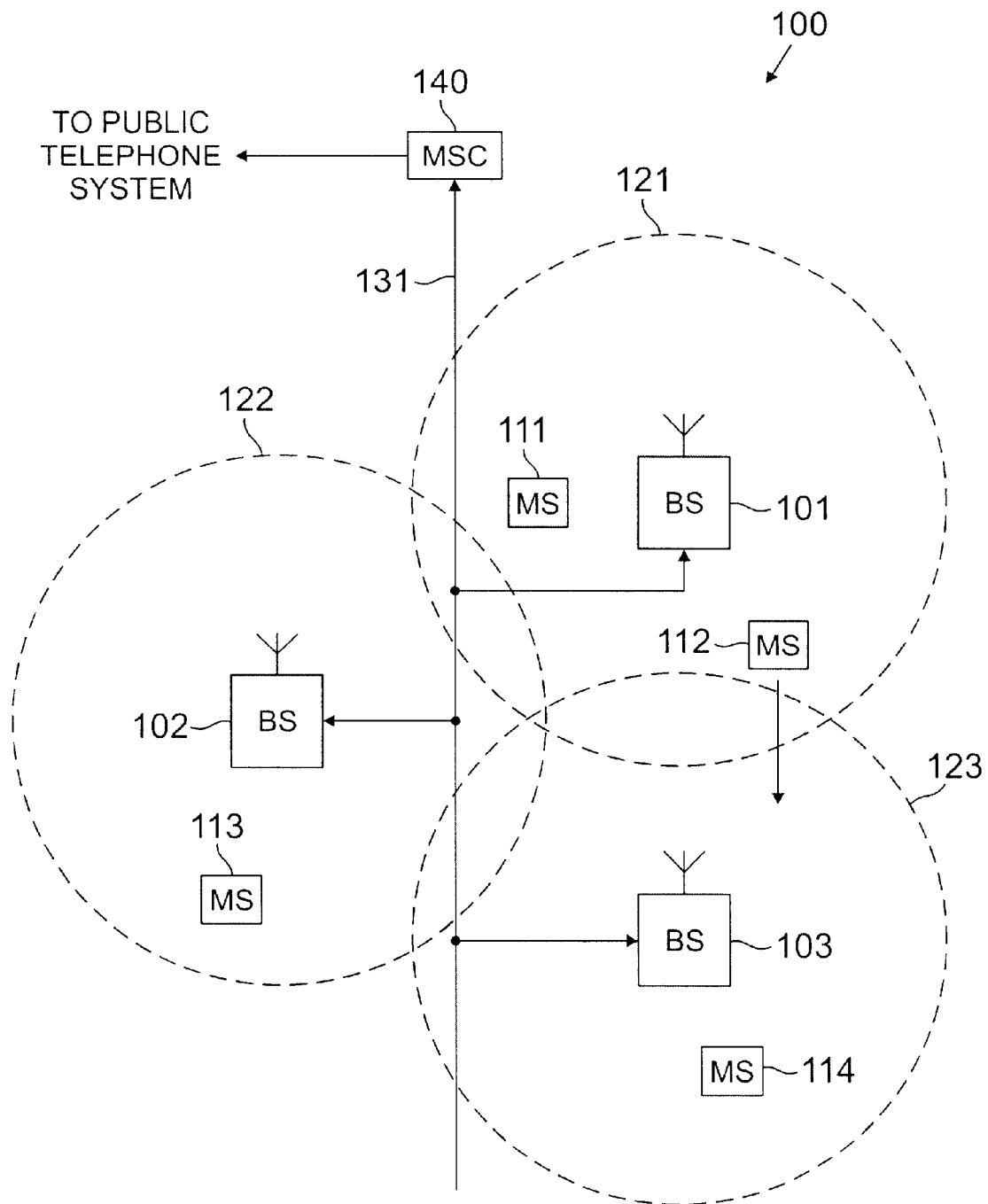
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
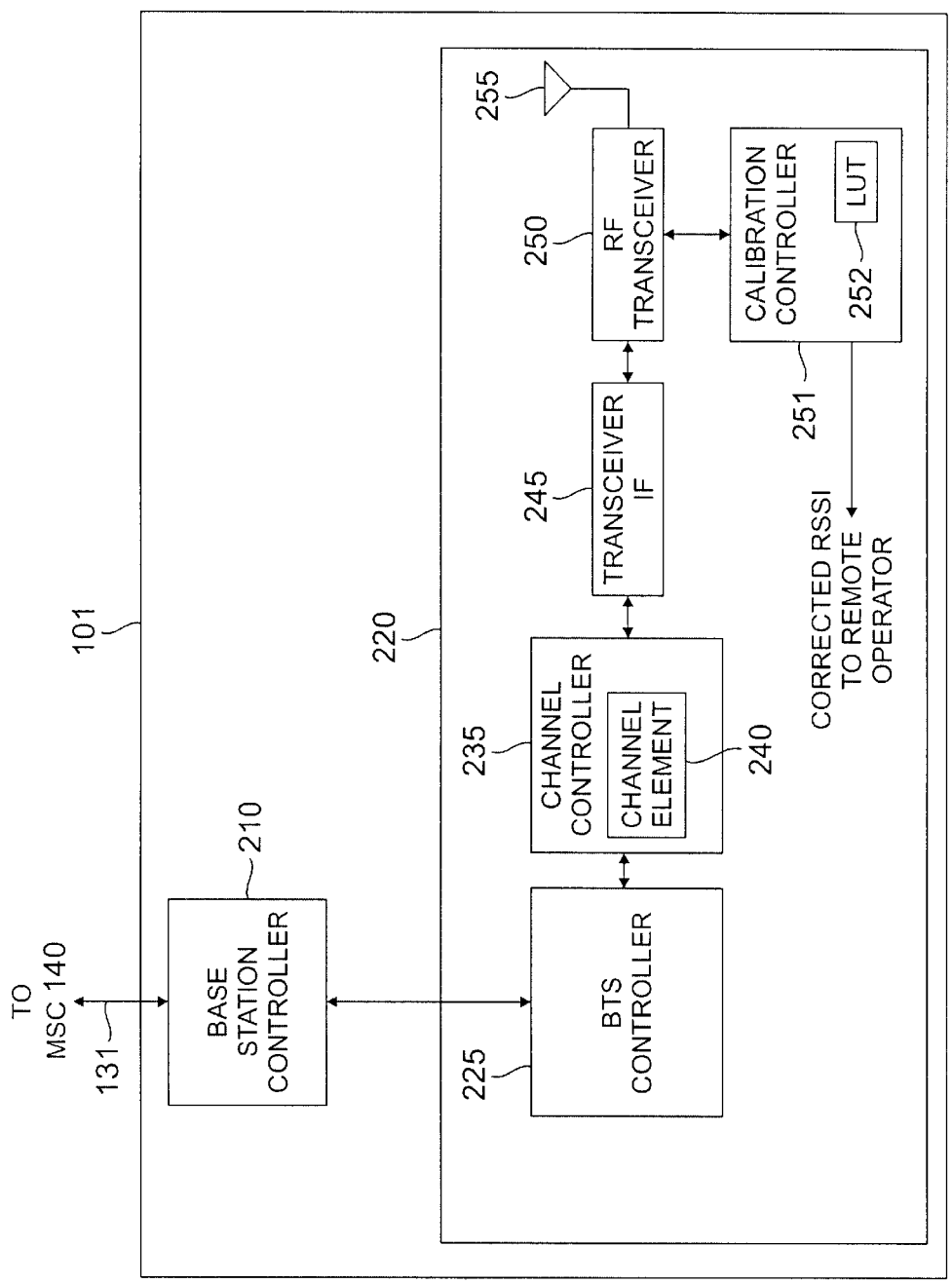
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250, antenna array 255 and calibration controller 251 which contains look-up table (LUT) 252. Calibration controller 251, in conjunction with test circuitry located in RF transceiver 250, performs antenna impedance matching and receiver gain calibration. RF transceiver 250 and calibration controller 251 are described below in greater detail in connection with FIGS. 3 and 5.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements operate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Figure 3:
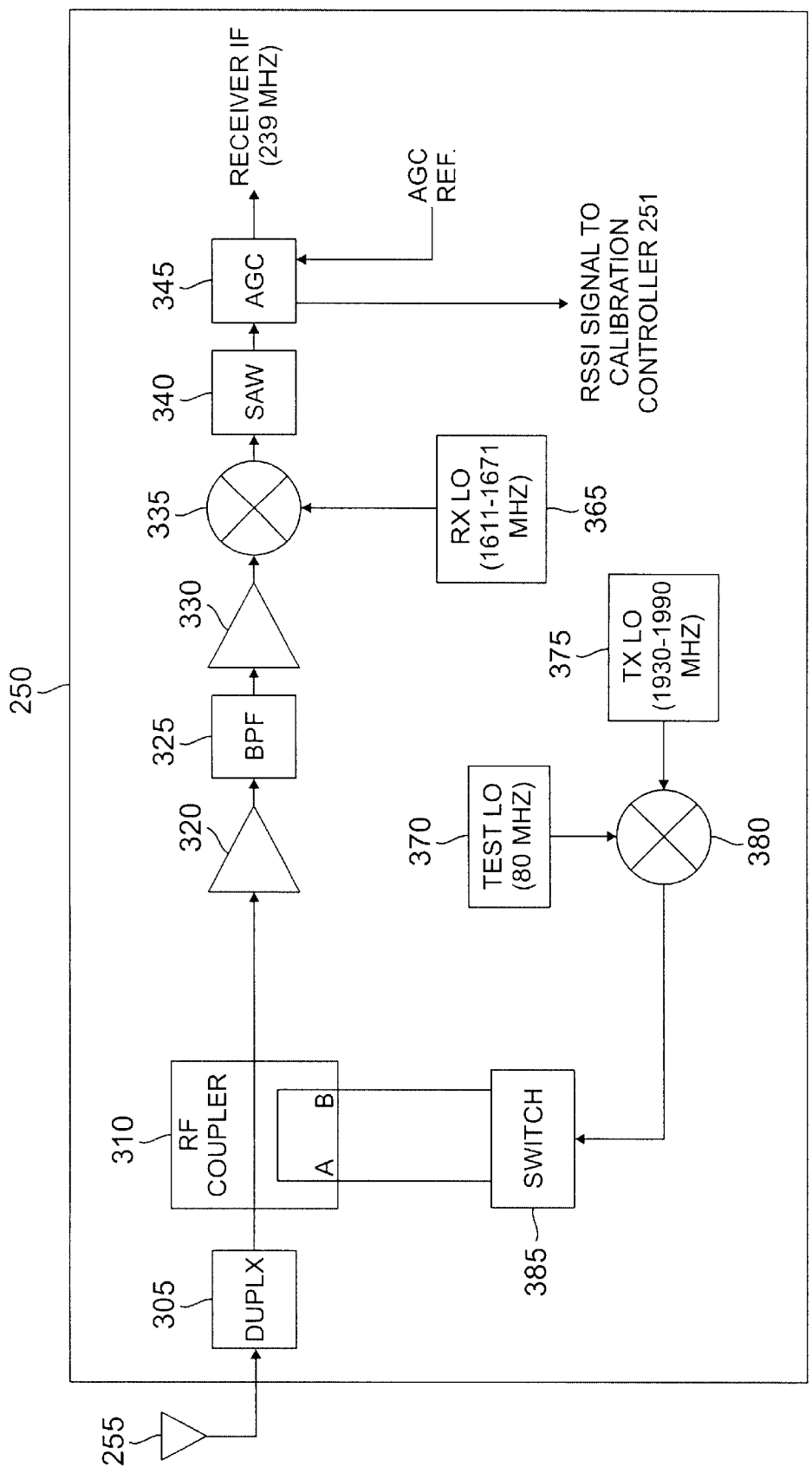
FIG. 3 illustrates in greater detail an exemplary RF transceiver in accordance with one embodiment of the present invention.

FIG. 3 illustrates a receive signal path through antenna array 255 and exemplary RF transceiver 250. The RF receive path through RF transceiver 250 comprises duplexer 305, RF coupler (RFC) 310, RF amplifier 320, band pass filter (BPF) 325, RF amplifier 330, RF mixer 335, surface acoustic wave (SAW) filter 340, and automatic gain control circuit (AGC) 345.

RF transceiver 250 also comprises receiver (RX) local oscillator (LO) 365 and transmitter (TX) local oscillator (LO) 375. Exemplary signal injection circuits associated with the present invention comprise test local oscillator (LO) 370, RF mixer 380, and switch 385. The receiver IF signal output by RF transceiver 250 is a modulated intermediate frequency (IF) signal centered at 239 MHz. Besides providing the IF output, AGC 345 also generates a received signal strength indication (RSSI) signal that is provided as an output to calibration controller 251.

Duplexer 305 serves as an RF filter and couples antenna array 255 to RF transmitter and the RF receiver portions of transceiver 250. For example, duplexer 305 isolates the received signals in the 1850–1910 MHz frequency range from the transmitted RF output signal in the 1930–1990 frequency range. RFC 310 couples the incoming reverse channel signal from antenna 255 to the input of amplifier 320 and allows test signals to be injected into antenna array 255 or the receive path using the RFC 310 inputs labeled "A" and "B."

Under normal conditions, RFC 310 transfers the received reverse channel signal from duplexer 305 to the receive signal path through amplifier 320. During testing and calibration procedures, switch 385, under control of calibration controller 251, may inject a test signal at input A of RFC 310 toward antenna array 255 or may inject a test signal at input B of RFC 310 toward the receive path through amplifier 320.

Amplifier 320 amplifies the output of RFC 310 to an intermediate level. BPF 325 filters the output of amplifier 320 to remove noise outside of the desired receiver frequency range of 1850–1910 MHz. (The difference between forward and reverse channel frequencies is constant for the frequency band and applicable country. For example, in conventional CDMA systems, the reverse (receive) channel frequency is 80 MHz below the forward (transmit) channel frequency.) BPF 325 may be centered at 1880 MHz.

RF amplifier 330 further amplifies the output of BPF 325 to the level needed for use by RF mixer 335. RF mixer 335 down-converts the output of RF amplifier 330 by mixing it with the reference signal in the 1611–1671 MHz frequency range from RX LO 365, to produce an intermediate frequency signal. RF mixer 335 effectively shifts the spread spectrum signal centered around the receiver RF frequency down to an intermediate frequency (IF) signal centered around 239 MHz. At this point, the signal output by RF mixer 335 may have spurious signals outside of the desired frequency range which have been amplified and/or introduced by the numerous amplification steps. Surface acoustic wave (SAW) filter 340 is an extremely narrow filter that blocks all but the desired frequencies from reaching AGC 345.

AGC 345 automatically adjusts the output of SAW filter 340 in order to maintain a constant level of IF output power, as described in greater detail below. RX LO 365 provides a single carrier frequency output in the 1611–1671 MHz range which is 239 MHz down from the TX LO 375 transmit carrier frequency, as previously discussed. Test LO 370 provides a stable reference signal, 80 MHz for example, that may be used for injecting a known frequency component into the forward or reverse signals for internal testing purposes. These signal selections have advantages since 80 MHz represents the frequency separation between the forward and reverse signals, and the TX LO and RX LO signals are already available at precisely known power levels in transceiver 250. Typically, test LO 370 comprises a multiplier or a phase-locked loop (PLL) referenced to a very stable 10 MHz reference clock and the necessary amplification circuits to generate a stable 80 MHz local oscillator signal with a known precise frequency and amplitude for input to RF mixer 380.

Similarly, TX LO 375 generates a stable single frequency output signal in the 1930–1990 MHz range, providing an RF carrier frequency for exemplary CDMA transmissions. As described previously, the transmitter carrier frequency is 80 MHz above the receiver carrier frequency present in the reverse channel. In an exemplary embodiment, TX LO 375, used by the transmitter portion of RF transceiver 250, includes automatic gain control capabilities that provide a very accurate output within +/−0.5 dB of the desired power level. RF mixer 380 uses the 80 MHz reference signal from test LO 370 to modulate the transmitter carrier signal from TX LO 375 to generate a stable test injection signal with a single carrier frequency in the 1850–1910 MHz range in which the receiver operates.

Switch 385, under control of calibration controller 251, injects the test signal from RF mixer 380 into either input A or input B of RFC 310. When BTS 220 is operating under normal conditions, switch 385 disables the transfer of the test output from RF mixer 380 to test outputs A or B. Under software control, for instance when the operating temperature exceeds a predetermined level or BTS 220 is reset, switch 385 receives a test indication from calibration controller 251 which causes input B to be enabled for calibration of RF transceiver 250.

The RSSI calibration is made by injecting a continuous wave (CW) tone into the receiver front-end through input B of RFC 310. The receive path of RF transceiver 250 treats the injected CW tone from RFC 310 as a normal component of the received forward channel signal which is amplified and then adjusted and filtered by AGC 345 to produce the RSSI signal. Calibration controller 251 compares the resultant RSSI signal with the known injected test signal to generate attenuation correction factors for storage in look-up table 252 and for transfer to the operator. Thus, compensation factor data stored in and transferred from look-up table 252 represents the attenuation characteristic curve for RF transceiver 250. In one embodiment of the invention, the attenuation factors stored in look-up table 252 may represent different attenuation factors exhibited by RF transceiver 250 in different temperature ranges.

During normal operating conditions, calibration controller 251 may periodically measure the RSSI level and adjust the measured RSSI value using the RSSI correction factors for the current temperature stored in look-up table 252. Calibration controller 251 may then periodically transfer the corrected RSSI result to the wireless service provider (i.e., remote operator) that operates wireless network 100.

BTS 220 determines the antenna match from the voltage standing wave ration (VSWR) of the antenna by comparing the RSSI level of the receive path injected test signal to the RSSI level of the test signal injected into and reflected by antenna array 255. After the previously described calibration measurement procedure has been performed, calibration controller 251 initiates the VSWR measurement by using switch 385 to inject a test signal of a known precise amplitude into the receive path through input B of RFC 310. Calibration controller 251 measures the level of the RSSI signal corresponding to the injected test signal and determines any necessary correction factor to compensate for losses in the receive path. The RSSI correction factors are stored in LUT 252.

Next, calibration controller 251 uses switch 385 to inject the test signal from RF mixer 380 into antenna array 255 through input A of RFC 310. Some portion of the injected test signal is then reflected by antenna array 255, depending on the impedance match of antenna array 255. Ideally, no signal is reflected if there is a perfect impedance match. RF transceiver 251 filters and amplifies the reflected test signal as part of the normal receiver input signal, providing an RSSI level for measurement by calibration controller 251. Calibration controller 251 measures the component of the RSSI signal corresponding to the reflected test signal and adjusts the measured RSSI value of the reflected test signal according to the RSSI correction factors stored in LUT 252. The corrected result may be stored for comparison purposes and/or transmitted to the remote operator.

As described, exemplary transceiver 250 and calibration controller 251 provide the capability for calibrating the receiver gain and for measuring the impedance match of antenna array 255 and the power gain of the receiver. Advantageously, the present invention provides these capabilities while BTS 220 continues to process forward channel information.

RF transceiver 250 performs indicated tests while the system is operational by injecting test signals A or B at the receiver carrier frequency. Thus, RF transceiver 250 downconverts the test signal to zero frequency (i.e., DC signal) The test signal does not affect the demodulation process in RF transceiver 250 which occurs in a separate demodulator circuit that converts the 239 MHz IF output to separate I and Q baseband outputs, well known to those familiar with the present art. Depending on the relative power difference between the injected input A or input B test signal and the reverse channel signal, the reduction in signal level at the demodulator may represent a degradation of the receive signal, but not to a level which prevents demodulation of the desired reverse channel information. Besides allowing normal operation to continue, exemplary BTS 220 minimizes introduction of additional production costs by re-using existing receiver amplifier and detector circuits for measurement of the impedance match of the receive path for antenna 255.

The RSSI reading is customarily accomplished with some type of temperature compensation circuitry which adjusts variations in gain, attenuation, and detector slopes over temperature and frequency. The prior art methods provide varying degrees of accuracy with fluctuations due to device and component tolerances and changes over temperature and across frequency ranges. Prior art circuit analysis is typically characterized during preproduction, with the resultant characterization information being stored in memory for individual radios or mobile stations. This characterization process requires analysis of many units and increased time for developing an adequate profile for compensation purposes. Component substitutions and lot-to-lot device variations through-out the production interval introduce additional variations which are not considered during the radio characterization process.

The present invention provides a stable injection test signal with the corresponding RSSI reading being measured at any instantaneous temperature and operating channel, eliminating the necessity for characterization and compensation circuitry and continually adjusting for changes in component performance.

Prior art VSWR measurements on the transmit antenna are usually accomplished with a circulator or detector located at the output of the transmit path where high power levels are routed, switched, and detected. Since reflected high power levels have a tendency to radiate from any discontinuity in the reflected path and to load down the power amplifier, the gain characteristics of the amplifier may continually change, producing an inaccurate power reading. The present invention eliminates the use of a circulator, padding, and switches in favor of using a low power level signal for obtaining an accurate measurement of VSWR.

In addition, prior art implementations typically provide a precision oscillator frequency which is injected at one receiver band frequency for calibration when traffic is not present. The present invention provides the exemplary 80 MHz test carrier signal which allows calibration of the receiver at the operating frequency in the presence of traffic so that system operation is not interrupted.

Figure 4:
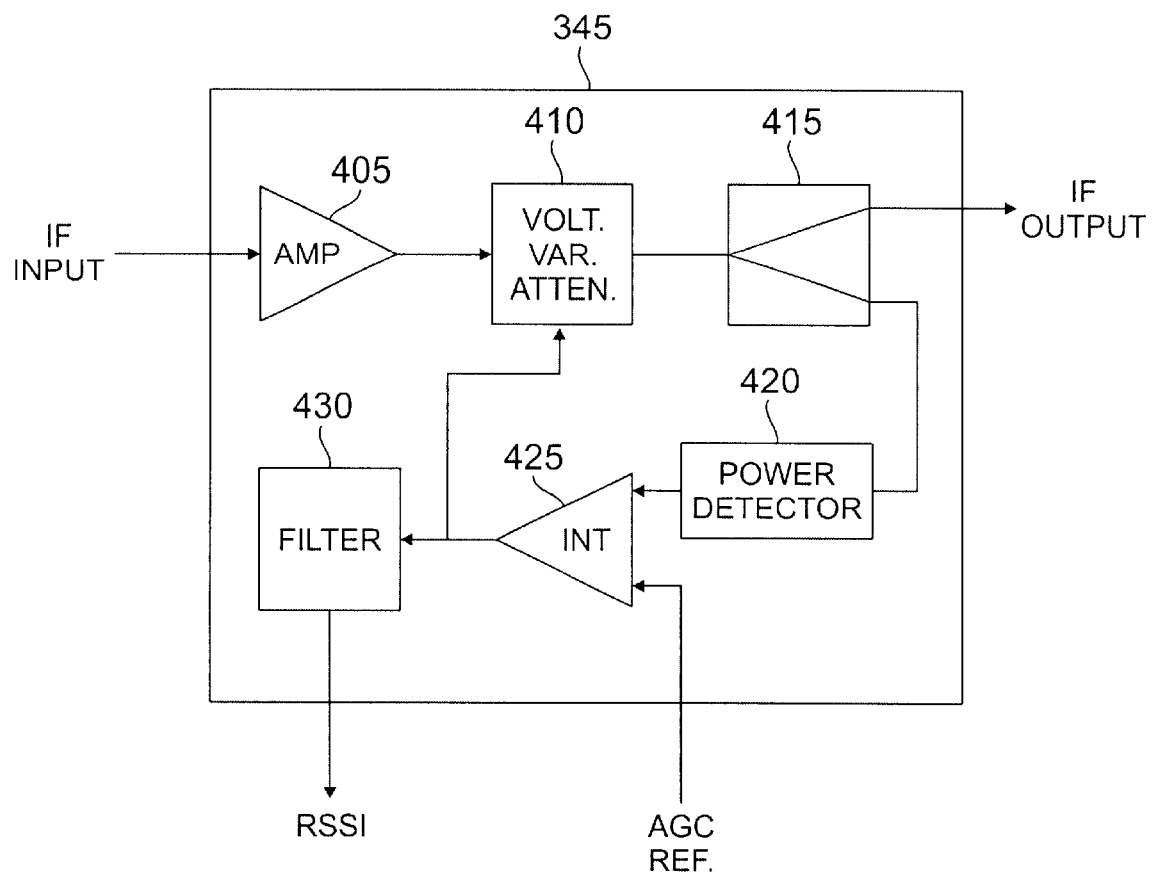
FIG. 4 illustrates an exemplary automatic gain control circuit in accordance with one embodiment of the present invention.

FIG. 4 illustrates exemplary AGC 345 in accordance with one embodiment of the present invention. Exemplary AGC 345 comprises amplifier 405, voltage variable attenuator 410, power splitter 415, power detector 420, integrator 425, and filter 430. Amplifier 405 amplifies the incoming IF signal from SAW 340 to an intermediate power level. Voltage variable attenuator 410 adjusts the input voltage from amplifier 405 in proportion to the input from integrator 425 to provide an adjusted power level for input to power splitter 415. Power splitter 415 splits the signal on its input into two modulated IF signals with known, related power levels (for instance two signals of equal power), one for IF output and a second signal for input to power detector 420.

Power detector 420 adjusts the IF signal on its input to provide a rectified DC signal for input to integrator 425. Integrator 425 integrates the difference between the signal from power detector 420 and the known AGC reference (ref) signal provided by BTS controller 225. The output of integrator 425 is the control voltage for voltage variable attenuator 410 and filter 430. Finally, filter 430 filters the output of integrator 425 to generate a "raw" received signal strength indication (RSSI) signal for input to calibration controller 251 for measurement and test purposes.

Figure 5:
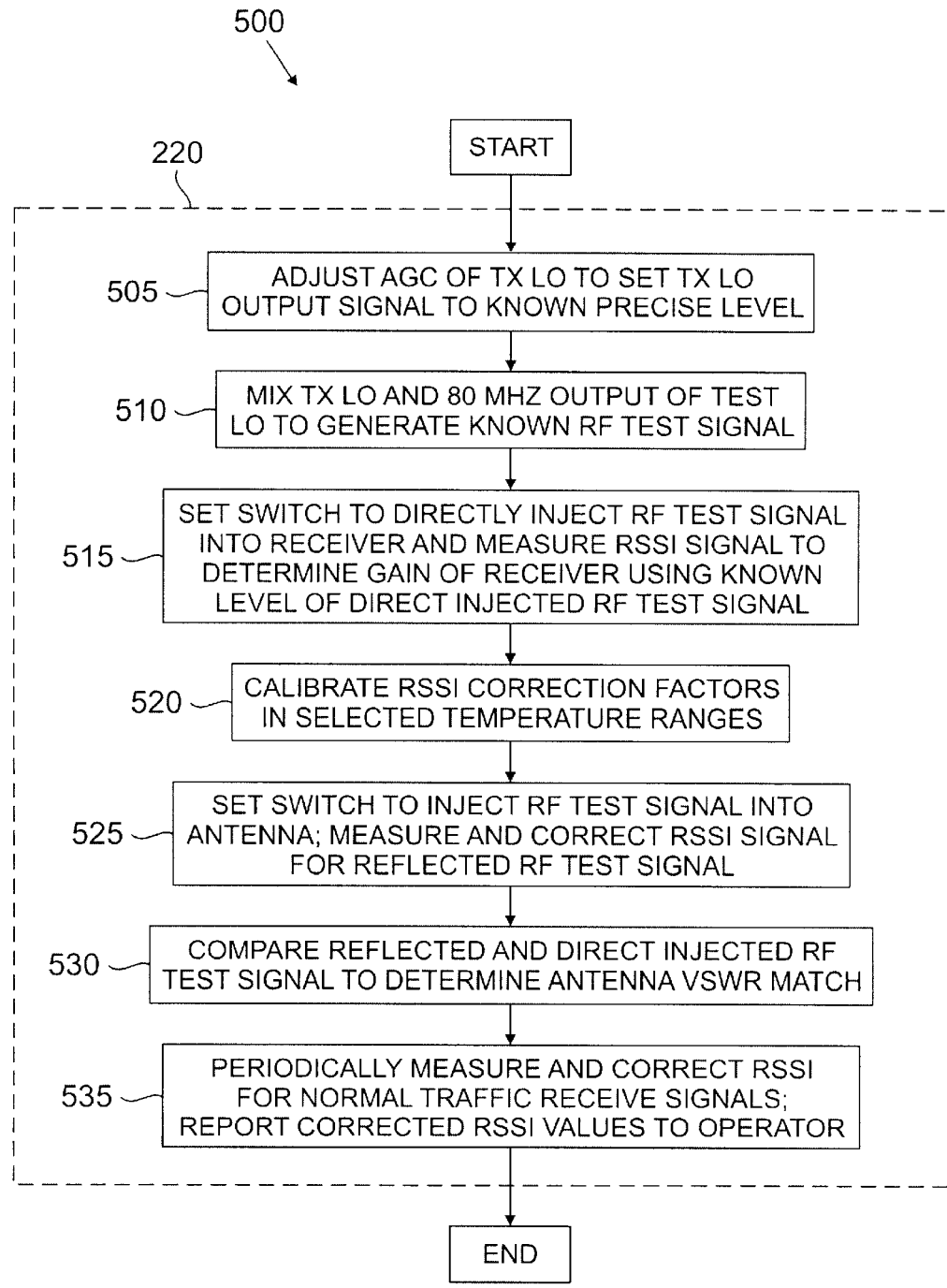
FIG. 5 illustrates an exemplary flow diagram in accordance with one embodiment of the present invention.

FIG. 5 depicts flow diagram 500, which illustrates the operation of base transceiver station (BTS) 220 according to one embodiment of the present invention. Under control of calibration controller 251, the output of TX LO 375 is set to a known and precise amplitude (process step 505). RF mixer 380 mixes the outputs from test LO 370 and TX LO 375 to create an RF test output signal with known amplitude and frequency. The test signal frequency is equal to the receiver carrier frequency (i.e., TX LO output—80 MHZ) (process step 510).

Next, calibration controller 251 causes switch 385 to inject the test signal from RF mixer 380 directly into the receiver through input B of RF coupler 310. The directly injected test signal passes through the receive path, and the resulting RSSI signal from AGC 345 is measured by calibration controller 251. Calibration controller 251 compares the measured RSSI signal with the known output level of RF mixer 380 to determine the gain of the receive path for the current ambient temperature (process step 515).

Since the difference between the injected test signal and the measured RSSI signal is know, calibration controller 251 may determine one or more correction factors for the RSSI signal level from AGC 345 at a variety of temperature levels for storage in look-up table 252. This process is repeated for different ambient temperatures (process step 520).

When the gain of the receive path is calibrated, calibration controller 251 causes switch 385 to switch the test signal on the B input of RFC 310 to the A input of RFC 310. Thus, the test signal is injected into antenna array 255, which reflects some portion of the test signal back into the receive path of RF transceiver 250. RF transceiver 250 amplifies and filters the reflected test signal through the receive path. Calibration controller 251 then measures the reflected test signal components in the RSSI signal (process step 525). Next, calibration controller 251 compares the measured RSSI levels for the direct injected test signal and the reflected test signal to determine the antenna voltage standing wave ratio (VSWR) match for antenna array 255 and stores this result in look-up table 252 for eventual transfer to the operator (process step 530). Thereafter, calibration controller 251 periodically measures and corrects the RSSI for normal traffic receive signals and reports the corrected RSSI values to the system operator (process step 535).

Although the present invention has been described in detail, those skilled in the art should understand that they can make various changes, substitutions and alterations herein without departing from the spirit and scope of the invention in its broadest form.

What is claimed is:

1. For use in an RF transceiver comprising an antenna and an RF receiver coupled to said antenna and having a receive path comprising circuitry capable of amplifying an incoming signal received from said antenna, a measurement and calibration circuit comprising:
    a test signal generator capable of generating a test signal having a known amplitude and a known frequency;
    a switch having an input coupled to said test signal generator for receiving said test signal, a first output coupled to an input of said receive path, and a second output coupled to said antenna;
    a test controller capable of causing said switch to directly inject said test signal into said input of said receive path and capable of causing said switch to inject said test signal into said antenna, wherein said antenna at least partially reflects said test signal into said receive path; and
    a signal monitor coupled to an output of said receive path capable of measuring said direct injected test signal and said reflected test signal, wherein said signal monitor compares a measured value of said direct injected test signal and a measured value of said reflected test signal to determine an impedance match of said antenna.

2. The measurement and calibration circuit set forth in claim 1 wherein said signal monitor is capable of adjusting a gain of said receive path.

3. The measurement and calibration circuit set forth in claim 1 wherein said known frequency of said test signal is the center frequency of said RF receiver.

4. The measurement and calibration circuit set forth in claim 1 wherein said test signal generator comprises a transmitter local oscillator capable of generating a transmitter carrier signal used by an RF transmitter of said RF transceiver, a test local oscillator capable of generating a single frequency reference signal, and an RF mixer capable of mixing said transmitter carrier signal and said single frequency reference signal.

5. The measurement and calibration circuit set forth in claim 4 wherein a frequency of said single frequency reference signal is equal to a frequency difference between a center frequency of said RF transmitter and a center frequency of said RF receiver.

6. The measurement and calibration circuit set forth in claim 5 wherein mixing by said RF mixer of said transmitter carrier signal and said single frequency reference signal is a subtractive mixing that generates said test signal at a center frequency of said RF receiver.

7. A base station for use in a wireless network comprising:
    an antenna;
    an RF receiver coupled to said antenna and having a receive path comprising circuitry capable of amplifying an incoming signal received from said antenna; and
    a measurement and calibration circuit comprising:
        a test signal generator capable of generating a test signal having a known amplitude and a known frequency;
        a switch having an input coupled to said test signal generator for receiving said test signal, a first output coupled to an input of said receive path, and a second output coupled to said antenna;
        a test controller capable of causing said switch to directly inject said test signal into said input of said receive path and capable of causing said switch to inject said test signal into said antenna, wherein said antenna at least partially reflects said test signal into said receive path; and
        a signal monitor coupled to an output of said receive path capable of measuring said direct injected test signal and said reflected test signal, wherein said signal monitor compares a measured value of said direct injected test signal and a measured value of staid reflected test signal to determine an impedance match of said antenna.

8. The base station set forth in claim 7 wherein said signal monitor is capable of adjusting a gain of said receive path.

9. The base station set forth in claim 7 wherein said known frequency of said test signal is the center frequency of said RF receiver.

10. The base station set forth in claim 7 wherein said test signal generator comprises a transmitter local oscillator capable of generating a transmitter carrier signal used by an RF transmitter of said RF transceiver, a test local oscillator capable of generating a single frequency reference signal, and an RF mixer capable of mixing said transmitter carrier signal and said single frequency reference signal.

11. The base station set forth in claim 10 wherein a frequency of said single frequency reference signal is equal to a frequency difference between a center frequency of said RF transmitter and a center frequency of said RF receiver.

12. The base station set forth in claim 11 wherein mixing by said RF mixer of said transmitter carrier signal and said single frequency reference signal is a subtractive mixing that generates said test signal at a center frequency of said RF receiver.

13. For use in an RF transceiver comprising an antenna and an RF receiver coupled to the antenna and having a receive path comprising circuitry capable of amplifying an incoming signal received from the antenna, a method of measuring and calibrating a gain of the receive path and measuring the impedance match of the antenna, the method comprising the steps of:

generating a test signal having a known amplitude and a known frequency;

directly injecting the test signal into the input of the receive path;

injecting the test signal into the antenna, wherein the antenna at least partially reflects the test signal into the input of the receive path;

measuring the direct injected test signal and the reflected test signal at the output of the receive path; and comparing a measured value of the direct injected test signal and a measured value of the reflected test signal to determine an impedance match of the antenna.

14. The method set forth in claim 13 including the step of adjusting a gain of the receive path in response to a level of the measured direct injected test signal.

15. The method set forth in claim 13 wherein the known frequency of the test signal is the center frequency of the RF receiver.

16. The method set forth in claim 13 wherein the step of generating a test signal comprises the steps of:

generating a transmitter carrier signal in a transmitter local oscillator used by an RF transmitter of the RF transceiver;

generating a single frequency reference signal in a test local oscillator; and mixing the transmitter carrier signal and the single frequency reference signal.

17. The method set forth in claim 16 wherein a frequency of the single frequency reference signal is equal to a frequency difference between a center frequency of the RF transmitter and a center frequency of the RF receiver.

18. The method set forth in claim 17 wherein the step of mixing the transmitter carrier signal and the single frequency reference signal is a subtractive mixing that generates the test signal at a center frequency of the RF receiver.

19. For use in an RF transceiver comprising an antenna and an RF receiver coupled to said antenna and having a receive path comprising circuitry capable of amplifying an incoming signal received from said antenna, a measurement and calibration circuit comprising:

a test signal generator capable of generating a test signal having a known amplitude and a known frequency, wherein said test signal generator comprises a transmitter local oscillator capable of generating a transmitter carrier signal used by an RF transmitter of said RF transceiver, a test local oscillator capable of generating a single frequency reference signal, and an RF mixer capable of mixing said transmitter carrier signal and said single frequency reference signal, wherein a frequency of said single frequency reference signal is equal to a frequency difference between a center frequency of said RF transmitter and a center frequency of said RF receiver;

a switch having an input coupled to said test signal generator for receiving said test signal, a first output coupled to an input of said receive path, and a second output coupled to said antenna;

a test controller capable of causing said switch to directly inject said test signal into said input of said receive path and capable of causing said switch to inject said test signal into said antenna, wherein said antenna at least partially reflects said test signal into said receive path; and a signal monitor coupled to an output of said receive path capable of measuring said direct injected test signal and said reflected test signal.

20. The measurement and calibration circuit set forth in claim 19 wherein said signal monitor is capable of adjusting a gain of said receive path.

21. The measurement and calibration circuit set forth in claim 19 wherein said known frequency of said test signal is the center frequency of said RF receiver.

22. The measurement and calibration circuit set forth in claim 19 wherein mixing by said RF mixer of said transmitter carrier signal and said single frequency reference signal is a subtractive mixing that generates said test signal at a center frequency of said RF receiver.

23. A base station for use in a wireless network comprising:

an antenna;

an RF receiver coupled to said antenna and having a receive path comprising circuitry capable of amplifying an incoming signal received from said antenna; and a measurement and calibration circuit comprising:

a test signal generator capable of generating a test signal having a known amplitude and a known frequency, wherein said test signal generator comprises a transmitter local oscillator capable of generating a transmitter carrier signal used by an RF transmitter of said RF transceiver, a test local oscillator capable of generating a single frequency reference signal, and an RF mixer capable of mixing said transmitter carrier signal and said single frequency reference signal, wherein a frequency of said single frequency reference signal is equal to a frequency difference between a center frequency of said RF transmitter and a center frequency of said RF receiver;

a switch having an input coupled to said test signal generator for receiving said test signal, a first output coupled to an input of said receive path, and a second output coupled to said antenna;

a test controller capable of causing said switch to directly inject said test signal into said input of said receive path and capable of causing said switch to inject said test signal into said antenna, wherein said antenna at least partially reflects said test signal into said receive path; and a signal monitor coupled to an output of said receive path capable of measuring said direct injected test signal and said reflected test signal.

24. The base station set forth in claim 23 wherein said signal monitor is capable of adjusting a gain of said receive path.

25. The base station set forth in claim 23 wherein said known frequency of said test signal is the center frequency of said RF receiver.

26. The base station set forth in claim 23 wherein mixing by said RF mixer of said transmitter carrier signal and said single frequency reference signal is a subtractive mixing that generates said test signal at a center frequency of said RF receiver.

27. For use in an RF transceiver comprising an antenna and an RF receiver coupled to the antenna and having a receive path comprising circuitry capable of amplifying an incoming signal received from the antenna, a method of measuring and calibrating a gain of the receive path and measuring the impedance match of the antenna, the method comprising the steps of:

generating a test signal having a known amplitude and a known frequency, wherein the step of generating a test signal comprises the steps of:

generating a transmitter carrier signal in a transmitter local oscillator used by an RF transmitter of the RF transceiver;

generating a single frequency reference signal in a test local oscillator; and mixing the transmitter carrier signal and the single frequency reference signal, wherein a frequency of the single frequency reference signal is equal to a frequency difference between a center frequency of the RF transmitter and a center frequency of the RF receiver;

directly injecting the test signal into the input of the receive path;

injecting the test signal into the antenna, wherein the antenna at least partially reflects the test signal into the input of the receive path; and measuring the direct injected test signal and the reflected test signal at the output of the receive path.

28. The method set forth in claim 27 including the step of adjusting a gain of the receive path in response to a level of the measured direct injected test signal.

29. The method set forth in claim 27 wherein the known frequency of the test signal is the center frequency of the RF receiver.

30. The method set forth in claim 27 wherein the step of mixing the transmitter carrier signal and the single frequency reference signal is a subtractive mixing that generates the test signal at a center frequency of the RF receiver.

* * * * *

UNITED STATES PATENT AND TRADEMARK OFFICE
CERTIFICATE OF CORRECTION

PATENT NO. : 6,603,810 B1
DATED : August 5, 2003
INVENTOR(S) : George A. Bednekoff and Mitchell K. Johnson It is certified that error appears in the above-identified patent and that said Letters Patent is hereby corrected as shown below:

Column 9,
Line 37, delete "know" and insert -- known --; and

Column 11,
Line 4, delete "staid" and insert -- said --.

Signed and Sealed this

Thirteenth Day of December, 2005

JON W. DUDAS
*Director of the United States Patent and Trademark Office*